(12) United States Patent
Liu

(10) Patent No.: US 9,373,905 B2
(45) Date of Patent: Jun. 21, 2016

(54) ELECTRICAL CARD CONNECTOR COMPATIBLY RECEIVING TWO CARDS

(71) Applicant: FOXCONN INTERCONNECT TECHNOLOGY LIMITED, Grand Cayman (KY)

(72) Inventor: Dong-Liang Liu, ShenZhen (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 14/601,476

(22) Filed: Jan. 21, 2015

(65) Prior Publication Data

US 2015/0207284 A1    Jul. 23, 2015

(30) Foreign Application Priority Data

Jan. 22, 2014   (CN) .......................... 2014 1 0028789

(51) Int. Cl.
*H01R 12/71* (2011.01)
*G06K 7/00* (2006.01)
*G06K 13/08* (2006.01)

(52) U.S. Cl.
CPC ............ *H01R 12/714* (2013.01); *G06K 7/0052* (2013.01); *G06K 13/0812* (2013.01)

(58) Field of Classification Search
CPC ....................................................... H01R 27/00
USPC ......................................................... 439/630
See application file for complete search history.

(56) References Cited

U.S. PATENT DOCUMENTS

| 6,056,573 | A  | * | 5/2000  | Nishioka  | H01R 12/714 |
|           |    |   |         |           | 235/441     |
| 6,099,353 | A  | * | 8/2000  | Wu        | G06K 7/0021 |
|           |    |   |         |           | 439/630     |
| 6,386,920 | B1 | * | 5/2002  | Sun       | G06K 7/0021 |
|           |    |   |         |           | 361/737     |
| 6,540,523 | B1 | * | 4/2003  | Kung      | H01R 12/721 |
|           |    |   |         |           | 439/541.5   |
| 6,612,492 | B1 | * | 9/2003  | Yen       | G06K 19/07743 |
|           |    |   |         |           | 235/451     |
| 6,641,413 | B2 | * | 11/2003 | Kuroda    | G06K 7/0021 |
|           |    |   |         |           | 439/159     |
| 6,642,614 | B1 | * | 11/2003 | Chen      | H01R 12/716 |
|           |    |   |         |           | 257/685     |
| 6,669,487 | B1 | * | 12/2003 | Nishizawa | G06K 19/0719 |
|           |    |   |         |           | 361/737     |

(Continued)

FOREIGN PATENT DOCUMENTS

| TW | M432173 | 6/2012 |
| TW | m432986 | 7/2012 |
| TW | M437546 | 9/2012 |

*Primary Examiner* — Ross Gushi
(74) *Attorney, Agent, or Firm* — Ming Chieh Chang; Wei Te Chung

(57) ABSTRACT

An electrical card connector (100) includes an insulative housing (1) defining a receiving space (10) along a front-and-rear direction thereof, a number of first contacts (211) and a number of second contacts (212) respectively retained in a front row and a rear row of the insulative housing, and a number of third contacts (221) retained in the rear row of the insulative housing. The first and second contacts constitute a first terminal group. The third and second contacts constitute a second terminal group. The first terminal group is adapted for engaging with a first card and the second terminal group is adapted for engaging with a second card.

16 Claims, 6 Drawing Sheets

(56) References Cited

U.S. PATENT DOCUMENTS

| | | | | |
|---|---|---|---|---|
| 6,672,904 B1* | 1/2004 | Chen | G06F 1/184 | 439/160 |
| 6,699,053 B2* | 3/2004 | Kuroda | G06K 7/0021 | 439/218 |
| 6,716,066 B1* | 4/2004 | Kuo | G06K 7/0034 | 361/737 |
| 6,746,280 B1* | 6/2004 | Lu | H01R 24/00 | 361/737 |
| 6,749,450 B1* | 6/2004 | Chen | H01R 27/00 | 439/188 |
| 6,761,320 B1* | 7/2004 | Chen | G06K 7/0047 | 235/492 |
| 6,761,572 B1* | 7/2004 | Chou | G06K 7/0043 | 439/188 |
| 6,783,399 B2* | 8/2004 | Joung | G06K 7/0043 | 361/737 |
| 6,805,589 B2 | 10/2004 | Lee | | |
| 6,814,622 B1* | 11/2004 | Lai | G06K 7/0043 | 439/631 |
| 6,835,100 B1* | 12/2004 | Chen | H01R 13/2442 | 439/630 |
| 6,857,907 B1* | 2/2005 | Hung | H01R 12/721 | 439/630 |
| 6,872,095 B2* | 3/2005 | Sato | G06K 13/0825 | 439/108 |
| 6,902,435 B1* | 6/2005 | Cheng | G06K 19/07741 | 361/737 |
| 6,908,321 B1* | 6/2005 | Lai | H01R 27/00 | 439/140 |
| 6,913,492 B2* | 7/2005 | Kuroda | G06K 7/0034 | 439/630 |
| 6,926,560 B1* | 8/2005 | Chu | G06K 7/0021 | 439/630 |
| 6,932,652 B1* | 8/2005 | Chen | H01R 27/00 | 439/630 |
| 6,932,654 B2* | 8/2005 | Washino | H01R 27/00 | 439/159 |
| 6,959,872 B2* | 11/2005 | Wong | G06K 7/0013 | 235/435 |
| 6,971,918 B1* | 12/2005 | Su | H01R 43/0256 | 361/737 |
| 6,974,349 B2* | 12/2005 | Tsai | H01R 12/721 | 439/260 |
| 6,994,574 B1* | 2/2006 | Lai | H01R 13/7039 | 439/159 |
| 7,009,846 B1* | 3/2006 | Wang | H05K 5/0286 | 235/492 |
| 7,048,588 B2* | 5/2006 | Chang | H01R 13/22 | 439/630 |
| 7,052,325 B2* | 5/2006 | Lin | G06K 7/0021 | 235/441 |
| 7,070,453 B1* | 7/2006 | Chen | H01R 27/00 | 439/159 |
| 7,104,846 B1* | 9/2006 | Yen | G06K 7/0043 | 439/630 |
| 7,114,993 B2* | 10/2006 | Chen | G06K 7/0034 | 361/735 |
| 7,118,420 B1* | 10/2006 | Lai | H01R 13/64 | 439/630 |
| 7,128,612 B2* | 10/2006 | Chang | H01R 27/00 | 439/630 |
| 7,153,165 B2* | 12/2006 | Lai | H01R 27/00 | 439/630 |
| 7,182,645 B2* | 2/2007 | Shimizu | G06K 7/0021 | 439/157 |
| 7,204,718 B2* | 4/2007 | Lai | H01R 27/00 | 439/630 |
| 7,229,300 B2* | 6/2007 | Lai | H01R 27/00 | 439/155 |
| 7,232,343 B1* | 6/2007 | Lai | H01R 12/714 | 439/630 |
| 7,255,603 B2* | 8/2007 | Kato | H01R 12/721 | 439/630 |
| 7,335,039 B2* | 2/2008 | Wang | G06K 7/0034 | 439/159 |
| 7,364,471 B2* | 4/2008 | Takahashi | H01R 13/642 | 439/630 |
| 7,367,844 B2* | 5/2008 | Xu | H01R 12/721 | 439/630 |
| 7,377,816 B1* | 5/2008 | Lin | G06K 7/0043 | 439/630 |
| 7,384,314 B1* | 6/2008 | Xu | H01R 27/02 | 439/541.5 |
| 7,393,221 B2* | 7/2008 | Feng | H01R 27/00 | 439/155 |
| 7,402,047 B2* | 7/2008 | Nishizawa | G06K 19/07 | 235/492 |
| 7,431,595 B1* | 10/2008 | Yen | G06K 7/0021 | 439/138 |
| 7,438,598 B1* | 10/2008 | Ito | G06K 7/0021 | 439/218 |
| 7,445,512 B1* | 11/2008 | Lai | G06K 7/0021 | 439/630 |
| 7,448,912 B1* | 11/2008 | Shiue | G06K 7/0034 | 439/630 |
| 7,516,903 B2* | 4/2009 | Nishizawa | G06K 19/0719 | 235/487 |
| 7,540,783 B2* | 6/2009 | Lai | G06K 7/0021 | 439/630 |
| 7,611,056 B2* | 11/2009 | Sato | G06K 7/0043 | 235/380 |
| 7,621,783 B1* | 11/2009 | Lai | H01R 13/629 | 439/630 |
| 7,628,624 B2* | 12/2009 | Ye | H01R 27/00 | 439/137 |
| 7,628,653 B2* | 12/2009 | Zhang | H01R 12/7005 | 439/630 |
| 7,670,188 B2* | 3/2010 | Zhang | H01R 27/00 | 439/630 |
| 7,758,387 B2* | 7/2010 | Yu | H01R 13/6456 | 439/631 |
| 7,771,231 B2* | 8/2010 | Kim | G06K 7/0021 | 439/541.5 |
| 7,819,678 B2* | 10/2010 | Ye | H01R 13/635 | 439/159 |
| 7,867,034 B1* | 1/2011 | Sato | G06K 7/0043 | 439/159 |
| 7,976,327 B2* | 7/2011 | Matsumoto | G06K 13/0862 | 439/326 |
| 7,980,870 B2* | 7/2011 | Tung | G06K 13/08 | 439/159 |
| 8,016,618 B2* | 9/2011 | Takai | G06K 7/0021 | 439/630 |
| 8,033,865 B2* | 10/2011 | Li | H01R 12/714 | 439/633 |
| 8,052,475 B2* | 11/2011 | Chan | G06K 13/08 | 439/630 |
| 8,109,773 B1* | 2/2012 | Little | G06K 7/0052 | 439/159 |
| 8,157,596 B1* | 4/2012 | Little | G06K 13/08 | 439/217 |
| 8,167,659 B2* | 5/2012 | Miller | H01R 13/642 | 439/235 |
| 8,292,667 B1* | 10/2012 | Huang | H01R 12/714 | 439/541.5 |
| 8,496,490 B2* | 7/2013 | Takai | G06K 13/0825 | 439/159 |
| 8,500,469 B2* | 8/2013 | Takai | G06K 7/0043 | 439/159 |
| 8,827,727 B2* | 9/2014 | Yang | G06K 7/0021 | 439/153 |
| 8,827,749 B2* | 9/2014 | Kim | G06K 7/0043 | 439/607.08 |
| 9,004,950 B2* | 4/2015 | Nakamura | G06K 19/07743 | 361/772 |
| 2004/0106326 A1* | 6/2004 | Hsieh | G06K 19/077 | 439/630 |
| 2005/0003711 A1* | 1/2005 | Chang | G06K 13/08 | 439/630 |
| 2005/0176304 A1* | 8/2005 | Yiu | H01R 27/00 | 439/630 |

(56) References Cited

U.S. PATENT DOCUMENTS

| | | | | |
|---|---|---|---|---|
| 2005/0227520 A1* | 10/2005 | Wu | ............... | G06K 7/0021 439/159 |
| 2009/0149070 A1* | 6/2009 | Feng | ............... | H01R 43/16 439/630 |
| 2013/0288535 A1* | 10/2013 | You | ............... | H01R 24/62 439/634 |
| 2014/0099805 A1* | 4/2014 | Kutchery | ............ | H04B 1/3816 439/76.1 |
| 2015/0011118 A1* | 1/2015 | Matsunaga | ............ | H01R 13/15 439/527 |
| 2015/0056851 A1* | 2/2015 | Zhang | ............... | H04B 1/3816 439/527 |
| 2015/0079847 A1* | 3/2015 | Liu | ............... | H01R 12/721 439/630 |
| 2015/0171552 A1* | 6/2015 | Lei | ............... | G06K 13/0831 439/153 |
| 2015/0207284 A1* | 7/2015 | Liu | ............... | G06K 7/0052 439/218 |

* cited by examiner

ELECTRICAL CARD CONNECTOR COMPATIBLY RECEIVING TWO CARDS

BACKGROUND OF THE INVENTION

1. Field of the Invention

The present invention relates generally to an electrical card connector, and more particularly to an electrical card connector compatibly receiving two cards and therefore alternatively receiving one of the two cards.

2. Description of Related Arts

Taiwan Pat. No. M437546 discloses an electrical card connector comprising an insulative housing, a plurality of contacts retained in the insulative housing, a metal shell covering the insulative housing for defining a receiving space, an ejector assembled at a side of the insulative housing for ejecting an inserted card out of the receiving space, and a tray member moveably received in the receiving space along a front-and-rear direction. The contacts are positioned along two rows for conforming to SIM (Subscriber Identity Module) card standard and therefore receiving a SIM card. Taiwan Pat. No. M432173 discloses another similar connector but that contacts thereof are positioned along a single row for conforming to micro SD card (Secure Digital Memory Card) standard and therefore receiving a micro SD card.

Each of the above-mentioned electrical card connectors only receives one card, such as a SIM card or a micro SD card. Taiwan Pat. No. M432986 discloses a connector capable of receiving two cards, the SIM card and the micro SD card. However, for either of the SIM card and the micro SD card, dedicated contacts are exclusively used, which occupies a large space.

An electrical card connector compatibly receiving two cards for saving occupied space is desired.

SUMMARY OF THE INVENTION

Accordingly, an object of the present invention is to provide an electrical card connector compatibly receiving two cards for saving occupied space.

To achieve the above object, an electrical card connector includes an insulative housing defining a receiving space along a front-and-rear direction thereof, a number of first contacts and a number of second contacts respectively retained in a front row and a rear row of the insulative housing, and a number of third contacts retained in the rear row of the insulative housing. The first and second contacts constitute a first terminal group. The third and second contacts constitute a second terminal group. The first terminal group is adapted for engaging with a first card and the second terminal group is adapted for engaging with a second card.

Other objects, advantages and novel features of the invention will become more apparent from the following detailed description when taken in conjunction with the accompanying drawings.

DETAILED DESCRIPTION OF THE PREFERRED EMBODIMENT

Figure 1:
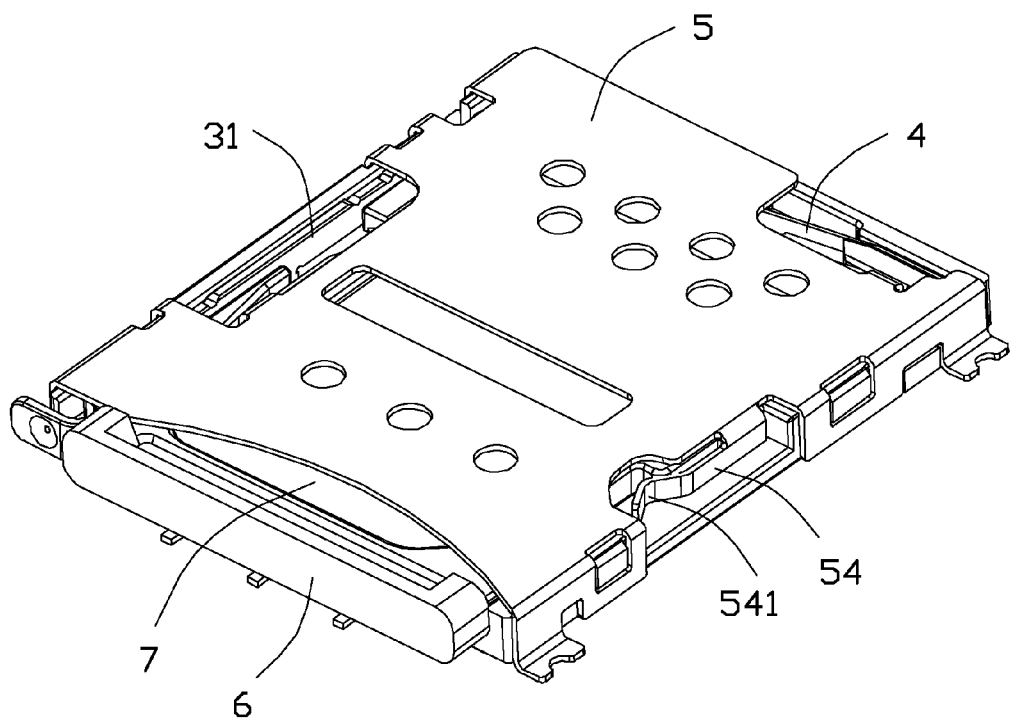
FIG. 1 is a perspective, assembled view of an electrical card connector constructed in accordance with the present invention.
Figure 2:
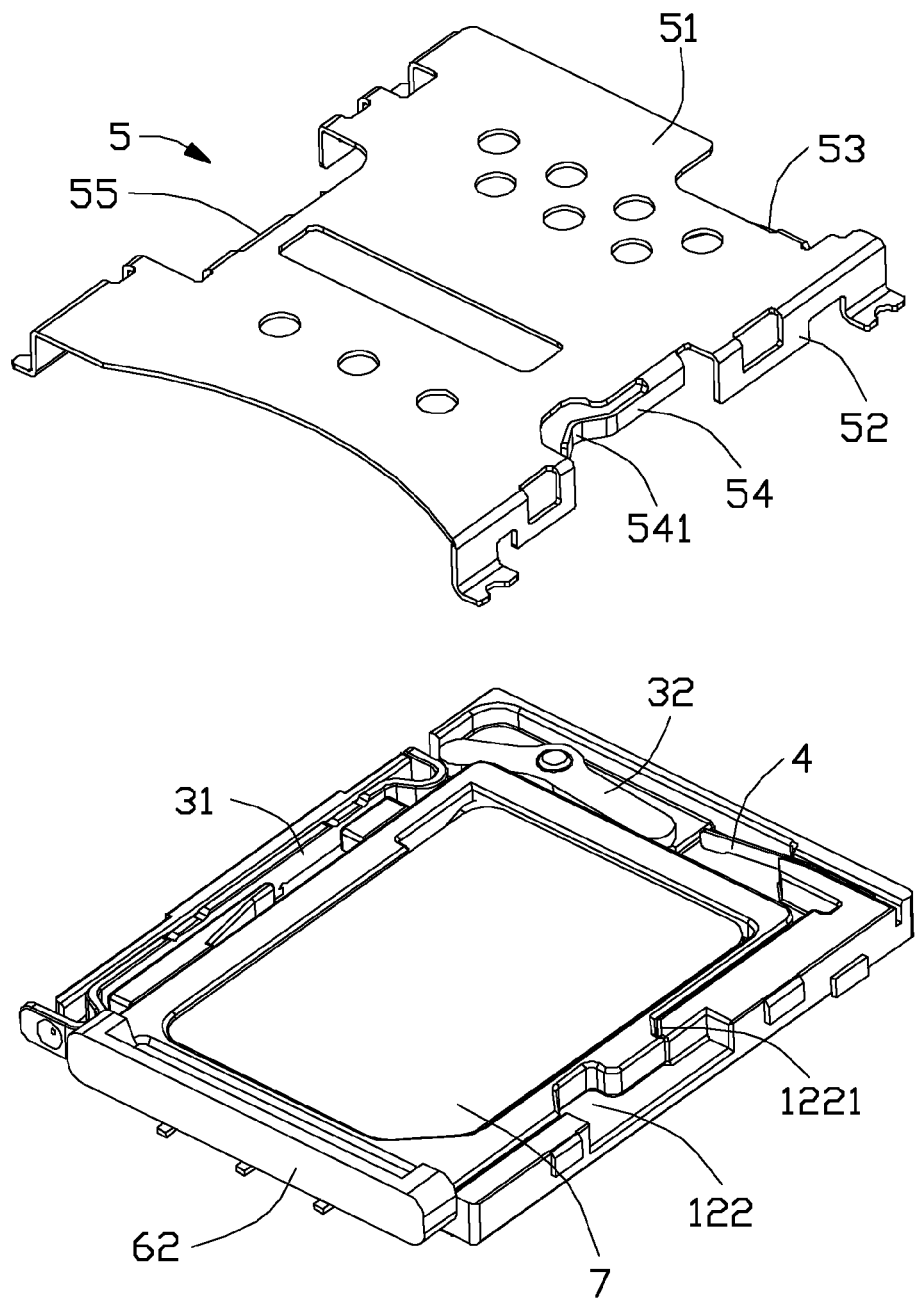
FIG. 2 is a perspective, partly exploded view of the electrical card connector of FIG. 1 when a metal shell is separated therefrom and a SIM card is received therein.

Reference will now be made in detail to the preferred embodiment of the present invention.

Referring to FIGS. 1-6, an electrical card connector 100 of the present invention, comprises an insulative housing 1, a plurality of contacts 2 retained in the insulative housing 1, an ejector 3 assembled at a left side and a rear side of the insulative housing 1, a switch element 4 formed at the rear side of the insulative housing 1, and a metal shell 5 covering the insulative housing 1 for defining a receiving space 10. The electrical card connector 100 is capable of alternatively receiving two cards, namely a SIM card 7 and a micro SD card 8. The electrical card connector 100 further comprises a tray member 6. The tray member 6 is received in the receiving space 10 for receiving the SIM card 7 when the SIM card 7 is in use. The tray member 6 is drawn from the receiving space 10 when the micro SD card 8 is inserted in the receiving space 10 for use. The terms of "left, rear" are not meant to be limiting but is descriptive of depiction according to the claims.

Figure 3:
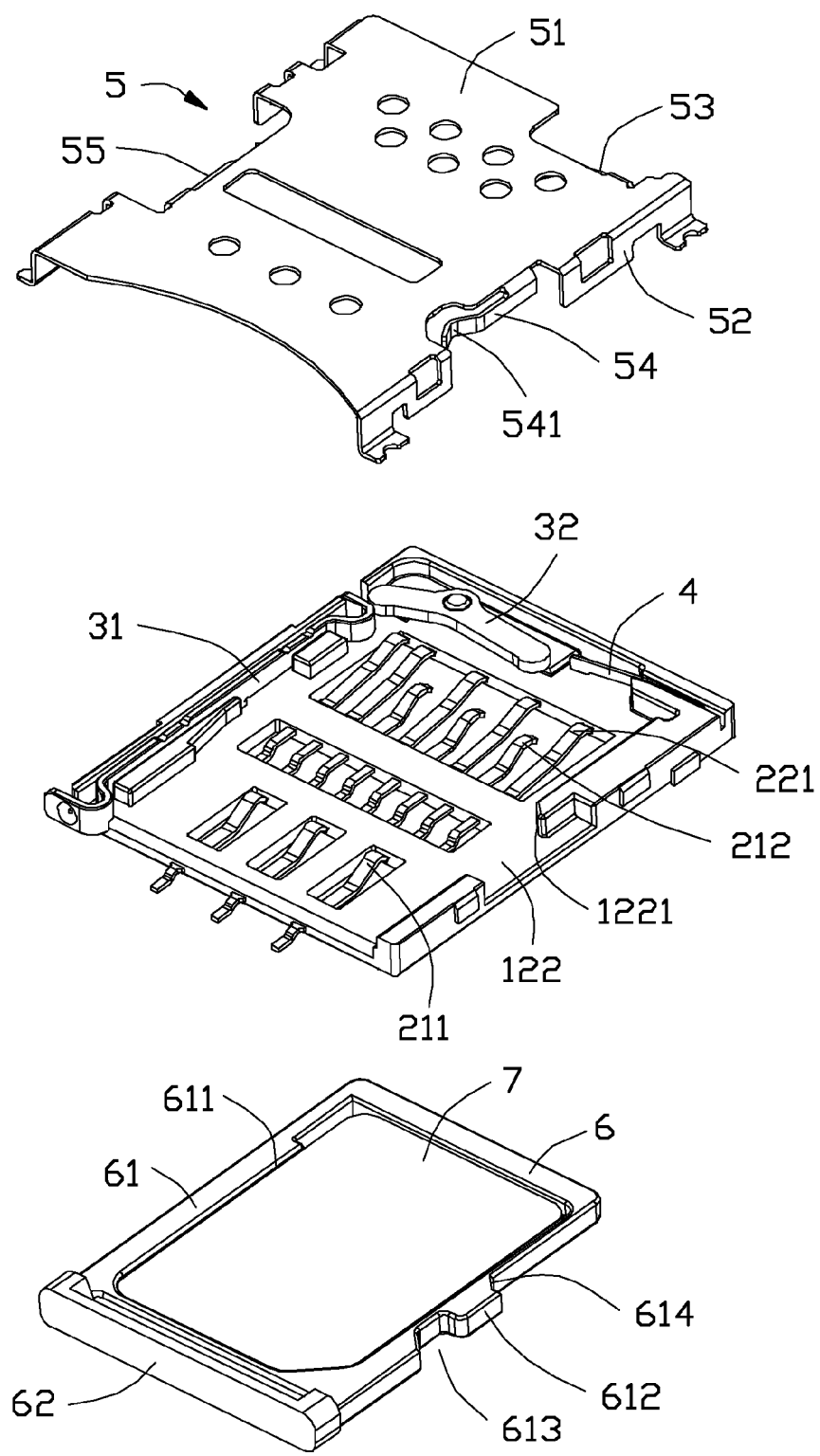
FIG. 3 is a perspective, partly exploded view of the electrical card connector of FIG. 2 when a tray member is further separated therefrom.
Figure 4:
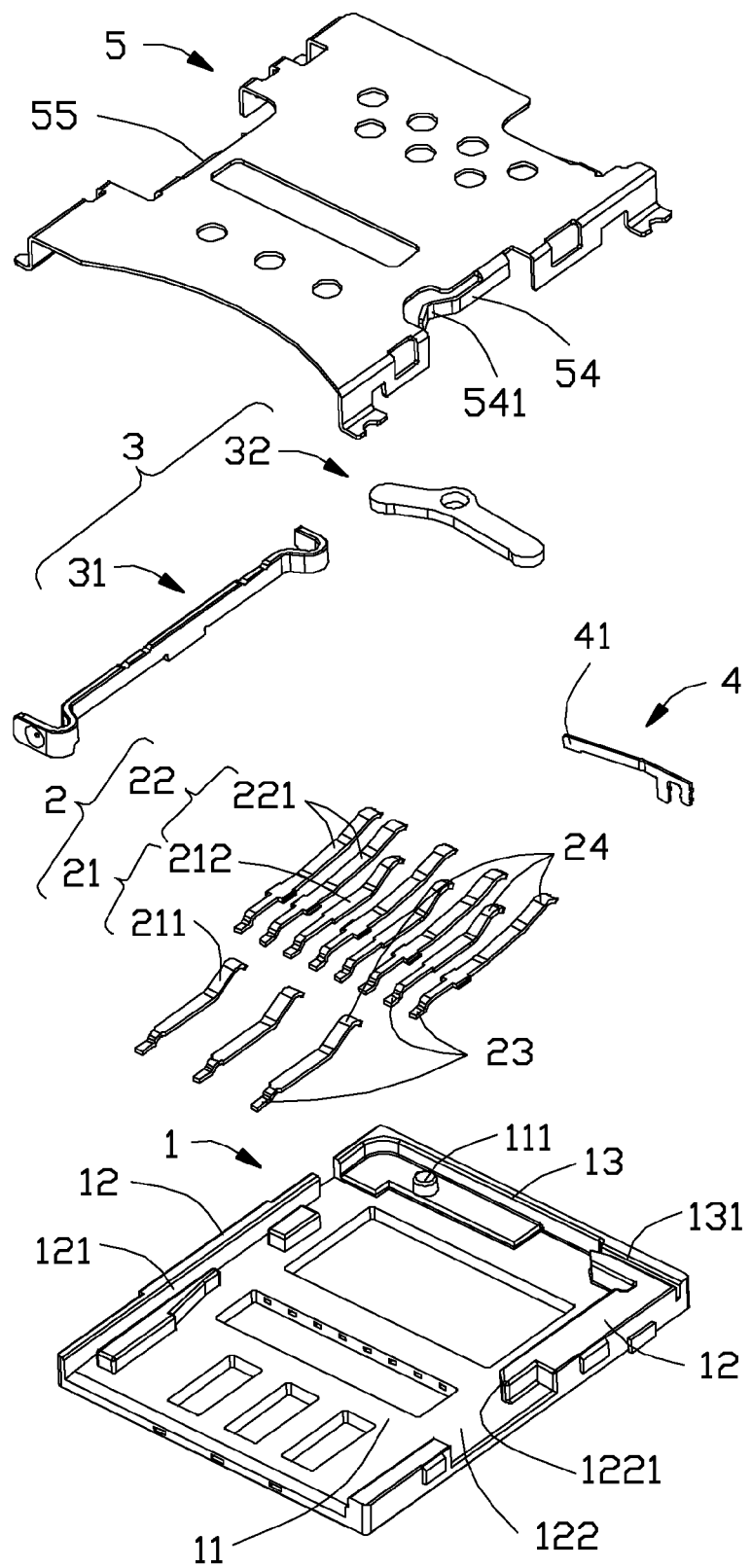
FIG. 4 is a perspective, fully exploded view of the electrical card connector of FIG. 1.
Figure 5:
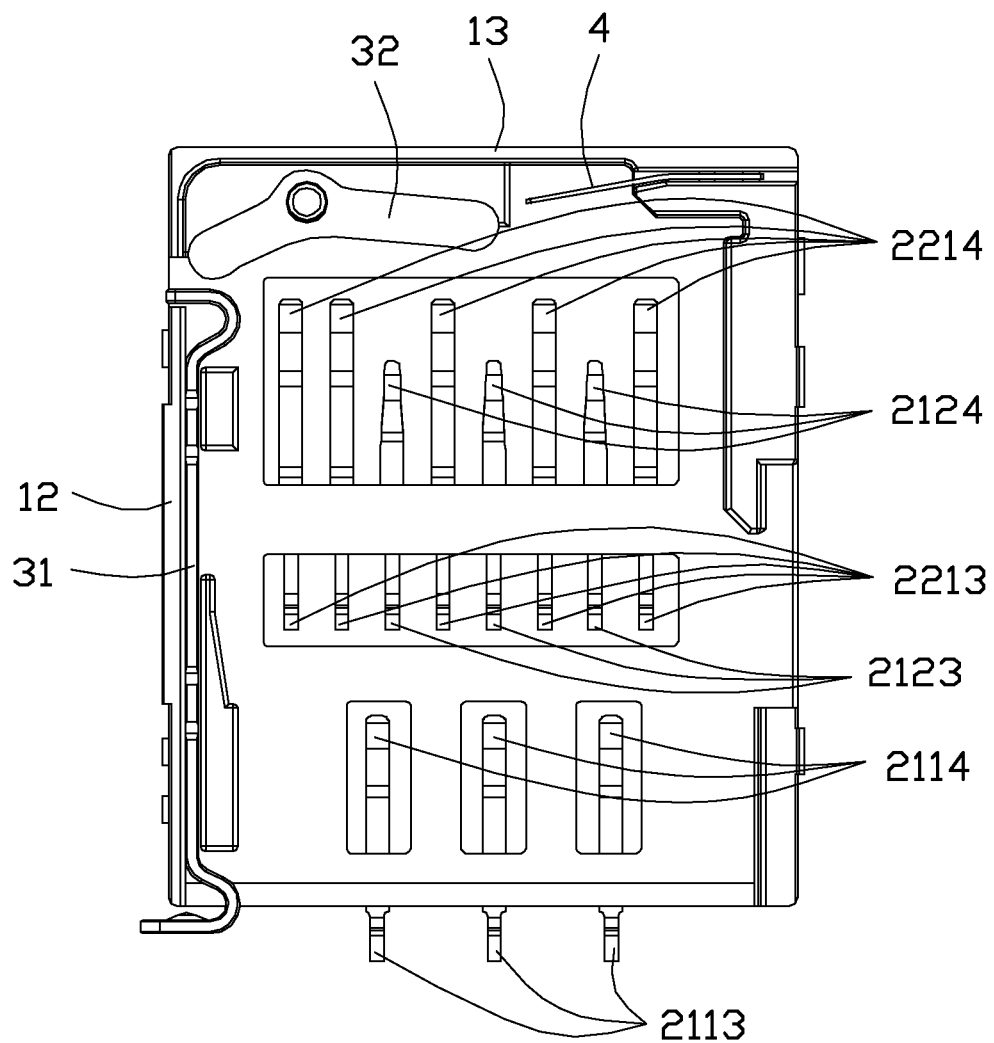
FIG. 5 is a top, elevational view of FIG. 1 when taken away the metal shell.
Figure 6:
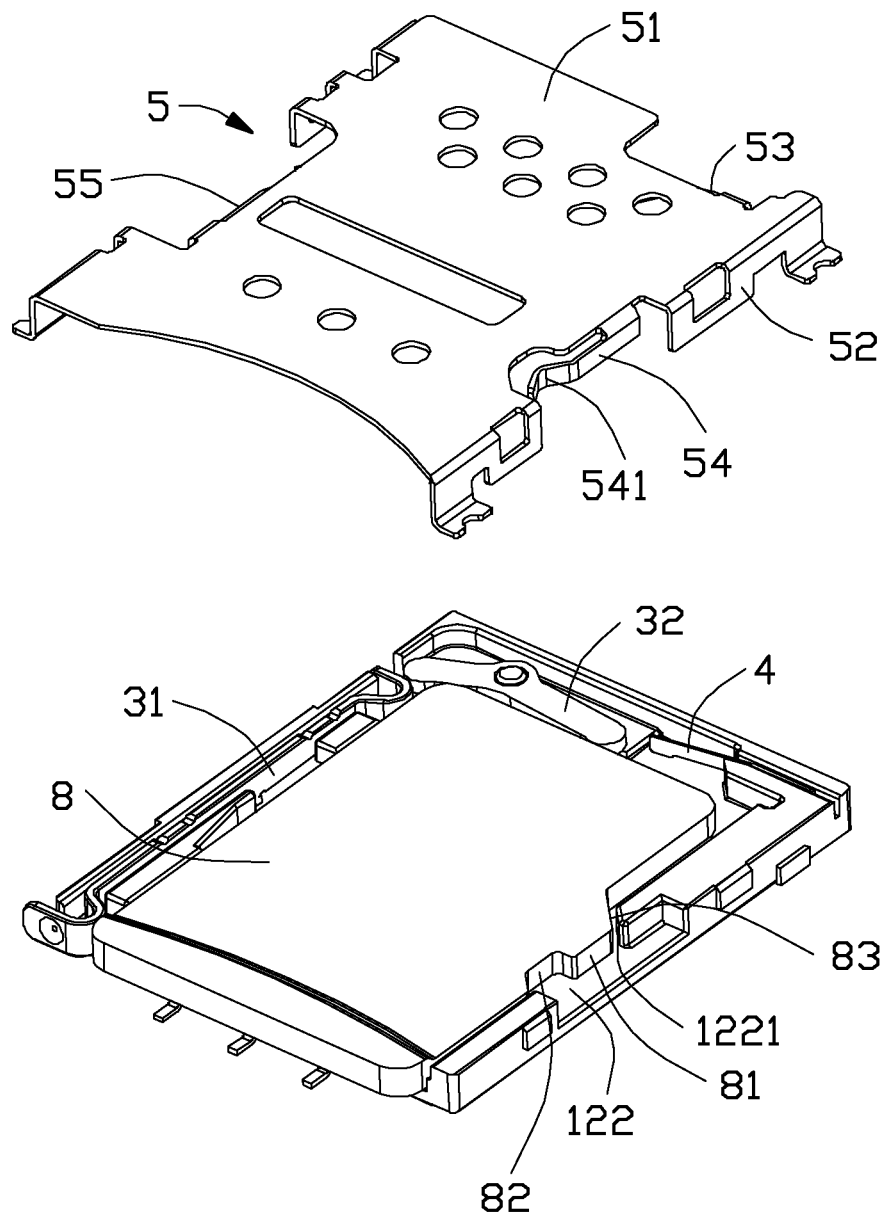
FIG. 6 is similar to FIG. 2 when a metal shell is separated therefrom and a micro SD card is received therein.

Referring to FIGS. 3 and 4, the insulative housing 1 comprises a base portion 11, a pair of left/right sidewalls 12 extending upwardly from two lateral edges of the base portion 11, and a rear wall 13 extending upwardly from the rear edge of the base portion 11. The metal shell 5 cooperates with the base portion 11, the left/right sidewalls 12, and the rear wall 13 for defining the receiving space 10. The left sidewall 12 defines a lengthwise slit 121 for assembling a shaft 31 of the ejector 3. The rear wall 13 defines a transverse slot 131 adjacent to the right sidewall 12 for positioning the switch element 4. The base portion 11 forms a pole 111 extending upwardly to beside the rear wall 13 for pivotally positioning an actuator 32 of the ejector 3. The right sidewall 12 defines a cutout 122 communicating with the receiving space 10 and exterior. The cutout 122 has a slant surface 1221 facing towards the receiving space 10.

Referring to FIGS. 3 and 4, the contacts 2 comprises a number of first contacts 211, a number of second contacts 212, and a number of third contacts 221 respectively positioned in three different rows. The first contacts 211 are positioned at front of the second contacts 212 and the third contacts 221 along a front-and-rear direction and space away from the second contacts 212 and the third contacts 221 for a certain distance in the front-and-rear direction. A number of the first contacts 211 is three, a number of the second contacts 212 is three, and a number of the third contacts 221 is five in the present embodiment of the invention. The number of the second contacts 212 is smaller than that of the third contacts 221. Therefore, the second contacts 212 are scattered into the third contacts 221. Three of the second contacts 212 and four of five third contacts 221 adjacent thereto are staggered with each other in a transverse direction perpendicular to the front-and-rear direction. Each of the contacts 2 has a soldering portion 23 and a contacting portion 24 extending backwardly and upwardly from the soldering portion 23. The first soldering portions 2113 of the first contacts 211 are positioned in a first, forefront straight line which is adjacent to an insertion opening through which the tray member 6 is inserted into the receiving space 10. The first contacting portions 2114 of the first contacts 211 are positioned in a second straight line farther to the insertion opening than the first soldering portion 2113. The second soldering portions 2123 of the second contacts 212 and the third soldering portions 2213 of the third contacts 221 are positioned in a third, same straight line farther to the insertion opening than the first contacting portions 2114 of the first contacts 211. The second contacting portions 2124 of the second contacts 212 are positioned in a fourth straight line farther to the insertion opening than the second, third soldering portions 2123, 2213 of the second, third contacts 212, 221. The third contacting portions 2214 of the third contacts 221 are positioned in a fifth straight line farthest to the insertion opening in all the soldering portions 23 and all the contacting portions 24 of the contacts 2.

Referring to FIGS. 3 and 4, generally speaking, the first contacting portions 2114, the second contacting portions 2124, and the third contacting portions 2214 are positioned in three different straight lines, the second soldering portions 2123 and the third soldering portions 2213 are positioned in the same straight line, and the first soldering portions 2113 is positioned in another straight line different from the second, third soldering portions 2113, 2123. Because the especial layout of the contacts 2, the first contacts 211 and the second contacts 212 are cooperatively combined into a first terminal group 21 for engaging with a SIM card 7, while the second contacts 212 and the third contacts 221 are cooperatively combined into a second terminal group 22 for engaging with a micro SD card 8. Therefore, the second contacts 212 are shared by the first terminal group 21 and the second terminal group 22. Two adjacent first contacts 211 have an interspace substantially twice as large as that of two adjacent second and third contacts 212, 221 of the second terminal group 22.

Referring to FIG. 3, the tray member 6 comprises a main portion 61 and a door portion 62 formed at a front side of the main portion 61. The main portion 61 has an outline substantially same as that of the micro SD card 8 and has a recess 611 substantially same as that of the SIM card 7. The main portion 61 has a protrusion 612 protruding outwardly and therefore, a notch 613 is defined at front of the protrusion 612 and a guiding surface 614 is defined behind the protrusion 612, just similar to the micro SD card 8 having a protrusion 81 with a notch 82 at front of the protrusion 81 and a guiding surface 83 behind the protrusion 81. When the tray member 6 is inserted in the receiving space 10, the SIM card 7 is received in the recess 611 of tray member 6 for engaging with the first terminal group 21. The metal shell 5 has a flexible beam 54 elastically extending into the notch 613 of the tray member 6 for securing the tray member 6 in the receiving space 10 at a final position. The protrusion 612 is received in the cutout 122. When the tray member 6 is drawn from the receiving space 10, the micro SD card 8 is received in the receiving space 10 for engaging with the second terminal group 22. The flexible beam 54 of the metal shell 5 elastically extend into the notch 82 of the micro SD card 8 for securing the micro SD card 8 in the receiving space 10 at a final position.

Therefore, the second contacts 212 are shared by the first terminal group 21 and the second terminal group 22, the electrical connector 100 of the present invention saves occupied spaces of the contacts 2.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. An electrical card connector comprising:
   an insulative housing defining a receiving space along a front-and-rear direction thereof;
   a plurality of first contacts and a plurality of second contacts respectively retained in a front row and a rear row of the insulative housing, the first and second contacts constituting a first terminal group; and
   a plurality of third contacts retained in the rear row of the insulative housing, the third and second contacts constituting a second terminal group; wherein
   the first terminal group is adapted for engaging with a first card and the second terminal group is adapted for engaging with a second card; and
   each of the first, second, and third contacts has a soldering portion and a Contacting portion respectively extending backwardly and upwardly from the Soldering portion, and the first contacting portions of the first contacts, the second Contacting portions of the second contacts, and the third contacting portions of the third contacts are positioned in three different straight lines.

2. The electrical card connector as claimed in claim 1, wherein the second soldering portions of the second contacts and the third soldering portions of the third contacts are positioned in a common straight line while the first soldering portions of the first contacts are positioned in another different straight line.

3. The electrical card connector as claimed in claim 2, wherein the first soldering portions, the first contacting portions, the second and third soldering portions, the second contacting portions, and the third contacting portions are positioned in five different straight lines.

4. The electrical card connector as claimed in claim 1, wherein the second contacts are scattered into the third contacts.

5. The electrical card connector as claimed in claim 4, wherein the number of the first contacts is three, the number of the second contacts is three, and the number of the third contacts is five.

6. The electrical card connector as claimed in claim 5, wherein three of the second contacts and four of the five third contacts adjacent thereto are staggered with each other in a transverse direction perpendicular to the front-and-rear direction.

7. The electrical card connector as claimed in claim 6, wherein two adjacent first contacts have an interspace substantially twice as large as that of two adjacent second and third contacts of the second terminal group.

8. An electrical card connector comprising:
   an insulative housing defining a receiving space along a front-and-rear direction thereof;
   a plurality of first contacts and a plurality of second contacts respectively retained to the insulative housing in a front row and in a rear row, respectively, the first and second contacts constituting a first terminal group; and
   a plurality of third contacts retained to the insulative housing in the rear row, the third and second contacts constituting a second terminal group; wherein
   the first terminal group is adapted for engaging with a first card and the second terminal group is adapted for engaging with a second card; and
   the first terminal group is adapted for engaging with a SIM (Subscriber Identity Module) card and the second terminal group is adapted for engaging with a micro SD (Secure Digital) card.

9. The electrical card connector as claimed in claim 8, further comprising a tray member, and wherein the tray member is received in the receiving space for alternatively receiving the SIM card or the micro SD card.

10. The electrical card connector as claimed in claim 9, wherein the tray member comprises a main portion and a door portion at a front side of the main portion, the main portion has an outline substantially same as that of the micro SD card and has a recess substantially same as that of the SIM card.

11. The electrical card connector as claimed in claim 10, wherein the main portion has a protrusion protruding outwardly, a notch in front of the protrusion, and a guiding surface behind the protrusion.

12. An electrical connector assembly for mutually exclusively receiving different first type card and second type card, comprising:

a. an insulative housing having a card receiving space and defining correlated front-to-back direction, transverse direction and vertical direction perpendicular to one another;

a plurality of first contacts disposed in the housing with corresponding first contacting sections extending into the card receiving space in a first row along the transverse direction;

a plurality of second contacts disposed in the housing with corresponding second contacting sections extending into the card receiving space in a second row along the transverse direction;

a plurality of third contacts disposed in the housing with corresponding third contacting sections extending into the card receiving space in a third row along the transverse direction; wherein the first contacting sections are aligned with corresponding second contacting sections in the front-to-back direction, respectively, for mating with the first type card while the third contacting sections and the second contacting sections are mixed up with each other along said transverse direction for mating with the second type card so as to have the same second contacting sections adapted to be shared by the different first type and second type cards.

13. The electrical connector assembly as claimed in claim 12, wherein said second contacts are alternately arranged with the corresponding third contacts with therebetween an equal first pitch which is twice another pitch defined in the first contacts.

14. The electrical connector assembly as claimed in claim 12, wherein the second row is located between the first row and the third row.

15. The electrical connector assembly as claimed in claim 14, wherein tails of both said second contacts and those of said third contacts are arranged in a fourth row between the first row and the second row.

16. The electrical connector assembly as claimed in claim 12, wherein the first contacts are similar to the second contacts except corresponding tails thereof.

* * * * *